(12) United States Patent
Schlotter et al.

(10) Patent No.: US 11,351,836 B2
(45) Date of Patent: Jun. 7, 2022

(54) STABILIZER BAR FOR A CHASSIS OF A MOTOR VEHICLE, AND METHOD FOR PRODUCING SUCH A STABILIZER BAR

(71) Applicant: ZF Friedrichshafen AG, Friedrichshafen (DE)

(72) Inventors: Sebastian Schlotter, Niederwerrn (DE); Witalij Knaub, Lotte (DE); Frank Nachbar, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 134 days.

(21) Appl. No.: 16/618,598

(22) PCT Filed: May 23, 2018

(86) PCT No.: PCT/EP2018/063537
§ 371 (c)(1),
(2) Date: Dec. 2, 2019

(87) PCT Pub. No.: WO2018/233968
PCT Pub. Date: Dec. 27, 2018

(65) Prior Publication Data
US 2020/0189346 A1      Jun. 18, 2020

(30) Foreign Application Priority Data

Jun. 21, 2017   (DE) .................... 10 2017 210 416.3

(51) Int. Cl.
*B60G 21/055*    (2006.01)
*B29C 45/00*     (2006.01)
(Continued)

(52) U.S. Cl.
CPC ...... *B60G 21/0551* (2013.01); *B29C 45/0005* (2013.01); *B60G 7/005* (2013.01);
(Continued)

(58) Field of Classification Search
CPC ................ B60G 21/0551; B60G 7/005; B60G 2204/1222; B60G 2204/1224;
(Continued)

(56) References Cited

U.S. PATENT DOCUMENTS

| 5,876,148 A | 3/1999 | Kraps |
| 6,109,816 A * | 8/2000 | Iwasaki ................. B60G 7/005 403/122 |

(Continued)

FOREIGN PATENT DOCUMENTS

| DE | 195 43 690 A1 | 5/1997 |
| DE | 102 27 014 A1 | 1/2004 |

(Continued)

OTHER PUBLICATIONS

Description Translation for (DE 102014218433) (Year: 2016).*
(Continued)

*Primary Examiner* — Jonathan Ng
*Assistant Examiner* — Daniel M. Keck
(74) *Attorney, Agent, or Firm* — Finch & Maloney PLLC; Michael J. Bujold; Jay S. Franklin (57) ABSTRACT

A stabilizer (1) for a chassis of a vehicle. The stabilizer has a curved stabilizer body (2) that forms a torsion spring, a pendulum support (5, 6) and a connecting element (7, 8). The connecting element (7, 8) connects the stabilizer body (2) and the pendulum support (7, 8) to one another. To reduce the cost and complexity of assembly. The stabilizer is characterized in that a first end (11) of the connecting element (7, 8) is injection-molded onto a pendulum support end (9).

15 Claims, 5 Drawing Sheets

(51) Int. Cl.
*B60G 7/00* (2006.01)
*B29L 31/30* (2006.01)

(52) U.S. Cl.
CPC ..... *B29L 2031/30* (2013.01); *B60G 2202/135* (2013.01); *B60G 2204/1222* (2013.01); *B60G 2204/1224* (2013.01); *B60G 2204/416* (2013.01); *B60G 2206/427* (2013.01); *B60G 2206/81012* (2013.01)

(58) Field of Classification Search
CPC ........ B60G 2202/135; B60G 2204/416; B60G 2206/427; B60G 2206/81012; B60G 2206/11; B29C 45/005
See application file for complete search history.

(56) References Cited

U.S. PATENT DOCUMENTS

| | | | |
|---|---|---|---|
| 7,195,398 | B2 | 3/2007 | Budde et al. |
| 2014/0027995 | A1 | 1/2014 | Kuroda |
| 2019/0217679 | A1* | 7/2019 | Kuroda ................. F16C 11/06 |

FOREIGN PATENT DOCUMENTS

| | | | | |
|---|---|---|---|---|
| DE | 10 2006 038 451 A1 | 2/2008 | | |
| DE | 10 2007 009 322 A1 | 9/2008 | | |
| DE | 10 2010 041 791 A1 | 4/2012 | | |
| DE | 10 2010 049 565 A1 | 4/2012 | | |
| DE | 102010041791 A1 * | 4/2012 | ............ | B60G 7/001 |
| DE | 10 2014 218 433 A1 | 3/2016 | | |
| DE | 10 2016 205 916 A1 | 10/2017 | | |
| JP | H08-295116 A | 11/1996 | | |
| WO | 2011/006492 A1 | 1/2011 | | |

OTHER PUBLICATIONS

German Office Action Corresponding to 10 2017 210 416.3 dated May 16, 2018.
International Search Report Corresponding to PCT/EP2018/063537 dated Aug. 23, 2018.
Written Opinion Corresponding to PCT/EP2018/063537 dated Aug. 23, 2018.

* cited by examiner

STABILIZER BAR FOR A CHASSIS OF A MOTOR VEHICLE, AND METHOD FOR PRODUCING SUCH A STABILIZER BAR

This application is a National Stage completion of PCT/EP2018/063537 filed May 23, 2018, which claims priority from German patent application serial no. 10 2017 210 416.3 filed Jun. 21, 2017.

FIELD OF THE INVENTION

The invention relates to a stabilizer for a chassis of a vehicle, having a curved stabilizer body that forms a torsion spring, with a pendulum support and with a connecting element, wherein the connecting element connects the stabilizer body and the pendulum support to one another. In addition the invention relates to a method for producing a stabilizer according to the invention.

BACKGROUND OF THE INVENTION

A stabilizer of this type is known from the still unpublished German patent application No. 10 2016 205 916.5. According to this the stabilizer comprises a curved basic body that forms a torsion spring made of fiber-reinforced plastic, and at least one connecting element arranged at an end thereof to connect the basic body to a pendulum support, wherein the connecting element is connected to the basic body by a snap-on connection.

Stabilizers of the type mentioned to begin with are also known as torsion bar springs. Stabilizers or torsion bar springs are generally known in automotive technology, particularly in chassis construction, for use as roll stabilizers. These are components stressed in torsion which reduce the rolling movement of a vehicle. To stabilize rolling of the body of motor vehicles, stabilizers can be arranged between the wheels on an axle of a motor vehicle. When the wheels of an axle jounce in alternation, stabilizers distribute the axle load and thus ensure a uniform axle load distribution. In that way the driving behavior of a motor vehicle can be influenced positively in such manner that, for example, the adhesion coefficients of the wheels on one axle can always be kept almost identically at a good level.

The free ends of known stabilizers can usually each be arranged and/or supported by means of pendulum supports on a separate component, for example a wheel-guiding element such as a wheel carrier or a wheel-guiding control arm. In that case the pendulum supports are usually designed as separate components. The pendulum supports must then be connected to the respective ends of the stabilizer body. This often entails complex or time-consuming assembly processes.

SUMMARY OF THE INVENTION

The object of the present invention is to further develop a stabilizer and a method as mentioned at the start, in such manner that that the cost and effort of assembly is reduced. Preferably, the number of individual components to be fitted for the installation of the stabilizer in a chassis of a vehicle should be reduced. Preferably, an alternative design form should be provided.

The objectives of the invention are achieved, respectively, by virtue of a stabilizer method according to the independent claim(s). Preferred further developments of the invention are indicated in the subordinate claims and in the description given below.

The stabilizer is designed for use in a chassis of a vehicle or motor vehicle. In this case the stabilizer comprises a curved stabilizer body that forms a torsion spring. In particular, in the context of the present application a stabilizer body is understood to be an elongated, strand-like, rod-like and/or tube-like body. In other words the stabilizer body can be hollow or tubular, or it can be made from solid material. As regards the curved design of the stabilizer body, it can be essentially U-shaped, C-shaped or curved in some other way. The stabilizer body can be made in several parts. In particular the stabilizer is designed as a roll stabilizer, so the stabilizer body can incorporate an actuator. The stabilizer body can be made in whole or at least in part of a metal and/or a fiber-plastic composite material.

Furthermore, the stabilizer comprises at least one pendulum support and at least one connecting element. The connecting element connects the stabilizer body and the pendulum support with one another. Thus, the connecting element can be designed as an intermediate component between the pendulum support on the one hand and the stabilizer body on the other hand. In particular, a first end of the connecting element is injection-molded onto an end of a pendulum support.

Here it is advantageous that since the first end of the connecting element is injection-molded onto the end of the associated pendulum support, the connection between the pendulum support and the connecting element can be prefabricated. By virtue of the injection-molding of the connecting element onto the end of the pendulum support, new options emerge for the production of a connection between the stabilizer body and the pendulum support. In particular, options emerge for simplifying the production and also the installation of the stabilizer. In this way, the assembly onto the stabilizer body and/or the final fitting of the stabilizer in a vehicle can be facilitated.

According to a further embodiment, an articulated connection is provided between the first end of the connecting element and the end of the pendulum support. Thus, the first end of the connecting element is articulated to the end of the pendulum support. In particular, the articulated connection is realized by virtue of a co-operation of the first end of the connecting element and the end of the pendulum support. Specifically, the articulated connection is in the form of a ball joint connection and/or a pivot joint axis connection. If a ball joint connection is made, the connecting element can comprise a joint housing section. In particular, the joint housing section has a housing recess. The joint housing section and/or the joint housing recess can essentially be pot-like. In the joint housing and/or the joint housing recess the end of the pendulum support can be fitted in an articulated manner, in particular so that it can pivot relative to the joint housing section.

Preferably, the end of the pendulum support has a joint ball. This joint ball can be at least partially surrounded by the first end of the connecting element. In that case the joint ball can be injection-molded into the first end of the connecting element. In particular, the joint ball is fitted into the first end of the connecting element in an articulated and/or pivotable manner. Starting from the joint ball, a stud section can extend out of the first end of the connecting element, in particular out of the housing section and/or the housing opening.

In an alternative design with an articulated connection designed as a pivot joint axis connection, instead of a joint ball a pivot joint with a pivot joint axis can be used. In particular, the pivot joint axis is axis-parallel to a rotation axis of the stabilizer. To compensate manufacturing tolerances, the pivot joint axis can be mounted in a rubber mounting, particularly an elastomer.

According to a further development, an unarticulated or solid connection is formed between a second end of the connecting element and a stabilizer body end of the stabilizer body. In particular the second end of the connecting element is remote from the first end of the connecting element. Compared with an articulated connection, an unarticulated or solid connection can be made simply. By virtue of the unarticulated or solid connection of the second end of the connecting element to the body end, a movement of the connecting element relative to the body end is prevented.

Preferably, the second end of the connecting element is injection-molded onto the end of the stabilizer body end. In that way the connecting element can be connected in a single working step at the same time to the pendulum support end and the stabilizer body end. To injection-mold the connecting element onto the pendulum support end and/or the body end, the pendulum support and/or the stabilizer body end can be placed in an injection-molding die. Thus, the stabilizer can be made as a composite component consisting of the stabilizer body, the connecting element and the pendulum support. Such a composite component reduces the number of individual components to be mounted in a chassis of a vehicle, since the composite component is prefabricated in its entirety. In that way the integration of the stabilizer into the chassis of a vehicle can be simplified. In particular, a fitting time and/or a cycle time can be reduced.

Alternatively or in addition, the second end of the connecting element can be connected to the stabilizer body end by a material-merged joint and/or a form-enclosing joint. The material-merged joint can for example be in the form of an adhesive joint. In particular, a form-enclosing joint is designed as a snap-on connection. By means of a snap-on joint an interlocked connection can be formed between the second end of the connecting element and the stabilizer body end, in particular without the use of a die. With such a material-merged and/or form-enclosing connection there is no need to injection-mold the connecting element onto the stabilizer body end. With this design, therefore, only the first end of the connecting element is injection-molded onto the end of the pendulum support. After the successful production of the connecting element, the pendulum support can be connected to the end of the stabilizer body by way of the connecting element and a suitable material-merged and/or form-enclosing joint. If the joint between the second end of the connecting element and the stabilizer body end is purely form-enclosing, this form-enclosing connection can enable a non-destructive separation of the joint, for example by virtue of its design as a snap-on joint.

Preferably, the stabilizer is made as a composite component that cannot be taken apart non-destructively. Particularly when the connecting element is injection-molded both onto the pendulum support end and also onto the stabilizer body end, a coherent composite component that cannot be taken apart non-destructively is obtained. In particular, the composite component comprises the connecting element, the pendulum supports and the stabilizer body.

In a further embodiment the stabilizer body has two stabilizer body ends remote from one another, each of which is connected to a pendulum support by means of a connecting element. Thus, the stabilizer body of the stabilizer expediently comprises two opposite and/or mutually remote stabilizer body ends, on which in each case a connecting element is arranged for connecting the stabilizer body to a respective pendulum support. For this the stabilizer body can be shaped in various ways, while usually, particularly when the stabilizer is used as a roll stabilizer, an essentially U-shaped form of the stabilizer body is preferred. The connecting elements and/or pendulum supports are in that case arranged at the ends of the two U-arms. The connecting element can serve as an interface between the stabilizer body and the pendulum support, and therefore for the transfer of forces between the stabilizer body and the pendulum support.

According to a further development, one stabilizer body end has an anti-twist feature that co-operates with the connecting element. The anti-twist feature prevents any movement of the connecting element relative to stabilizer body end. In this case the anti-twist feature can be in the form of an undercut and/or a flattened area. Alternatively or in addition, the anti-twist feature can comprise an oval section or be formed as such. Preferably, the anti-twist feature has an oval contour and/or an oval outer circumference. An oval section is understood to mean an outer circumference that deviates from circular shape, in particular one that is not round. In particular, the connecting element engages in the anti-twist feature of the stabilizer body end. By virtue of the anti-twist feature an orientation of the connecting element relative to the stabilizer body appropriate for the purpose can be ensured. Thus, for example even if the cross-section shape of the stabilizer body is essentially circular, twisting of the connecting element arranged, in particular injection-molded, onto the stabilizer body end can be prevented. For that purpose the stabilizer body end can have a cross-section shape that deviates from a circular cross-section, preferably with a flattened area and/or an undercut provided on a peripheral area. By a shape-matching design of the connecting element, in particular of the second end of the connecting element, in the connected condition any twisting of the connecting element relative to the stabilizer body end is effectively prevented. In that sense the connecting element and the end of the stabilizer body co-operate.

According to a further embodiment the connecting element is injection-molded onto a first pendulum support end of the pendulum support. At a second pendulum support end remote from the first pendulum support end, a connecting component is injection-molded on. Thus, both the connecting element and also the connecting component are made by an injection-molding process. In particular the connecting element and the connecting component can be made at the same time or in a conjoint work step. Preferably, the connecting component is first injection-molded onto the second pendulum support end. Only then, particularly in a further step, is the connecting element injection-molded onto the first pendulum support end. At the same time the connecting element can be injection-molded onto a stabilizer body end.

In particular, the connecting component comprises a further articulated connection. Thus, the connecting element and the connecting component can both function as articulations. The further articulated connection can be in the form of a ball joint connection and/or a pivot joint axis connection. For this, the connecting component can have a further joint housing section. The further joint housing section can have a further joint housing aperture. In particular the further joint housing section and/or the further joint housing aperture is designed to accommodate a further joint ball. In particular, the further joint ball is fitted in an articulated manner and/or so that it can pivot in the connecting component, preferably in the further joint housing section and/or in the further housing aperture. Starting from the further joint ball, a further stud section can extend out of the further joint housing section and/or the further housing aperture. When designed as a pivot joint axis connection, instead of a ball joint a pivot joint with a pivot joint axis can be used. For the compensation of manufacturing tolerances, the pivot joint axis can be mounted in a rubber mounting, in particular an elastomer.

According to a further development, the connecting element and/or the connecting component is/are made from plastic or a fiber-plastic composite. In that way the connecting element and/or the connecting component can be produced as a lightweight component by an injection-molding process. In particular the stabilizer body is made of plastic or a fiber-plastic composite. Compared with metal this results in a considerable weight advantage. A fiber-plastic composite can contain glass fibers, carbon fibers, basalt fibers or metallic fibers. In addition the fiber-plastic has at least one matrix, a resin or an adhesive, which forms a composite with the fiber material. By virtue of a specifiable orientation of the fiber layers and/or fibers a design appropriate for the rigidity requirements concerned can be produced. In particular, complex designs for a stabilizer and/or stabilizer body can be produced. Precisely in the under-floor area of a motor vehicle particularly strict demands are made on the component configuration options for a stabilizer. For example, the suspension struts, driveshafts, transverse control arms, brakes, brake lines or other components leave only little fitting space available for the installation of a stabilizer. By using a fiber-plastic composite it is possible to design and in particular curve a stabilizer in such manner that it makes optimal use of the fitting space available and at the same time ensures optimum functionality.

In particular, the pendulum support is made at least partially or completely of plastic or a fiber-plastic composite. The pendulum support and/or the complete stabilizer can be made as a hybrid component of different materials. Preferably, a joint ball of the pendulum support that co-operates with the connecting element and a stud section that extends out of the joint ball are made of metal. Preferably, only the connecting component of the pendulum support is made of plastic and/or a fiber-plastic composite. Accordingly, a further joint ball that co-operates with the connecting component and a further stud section extending from the further joint ball can also be made of metal.

In the method according to the invention for producing a stabilizer according to the invention, the stabilizer body and the pendulum supports are made first. In other words the stabilizer body and the pendulum supports are prefabricated as individual components. During the prefabrication the pendulum supports can already be provided with the further connecting component and/or the further articulated connection. After the stabilizer body and the pendulum supports have been made, the connecting element is produced as an injection-molded component. In particular, for this at least a pendulum support or an end of the pendulum support directed toward the end of the stabilizer body is placed in a suitably designed injection-molding die. When the connecting element is being injection-molded, it is at the same time injection-molded onto the end of the pendulum support. For that purpose the end of the pendulum support is directed toward the first end of the connecting element and/or arranged on it.

Preferably, while injection-molding the connecting element the connecting element is at the same time injection-molded onto the end of the stabilizer body. For this, the pendulum support and the stabilizer body can be placed together in an injection-molding die. It may be sufficient to position only the end of the pendulum support facing toward the stabilizer body and the end of the stabilizer body facing toward the pendulum support in the injection-molding die. A first end of the connecting element can be injection-molded onto the end of the pendulum support and a second end of the connecting element onto the end of the stabilizer body.

In particular, the stabilizer produced by the method according to the invention is a stabilizer according to the invention as described above. Preferably, the method is developed further in accordance with all the design features explained in connection with the stabilizer according to the invention described herein. Furthermore, the stabilizer described herein can be developed further in accordance with all the features explained in connection with the method.

BRIEF DESCRIPTION OF THE DRAWINGS

Below, the invention is explained in greater detail with reference to the figures, in which the same indexes refer to the same, similar or functionally equivalent components or elements. The figures show.

DETAILED DESCRIPTION OF THE PREFERRED EMBODIMENTS

Figure 1:
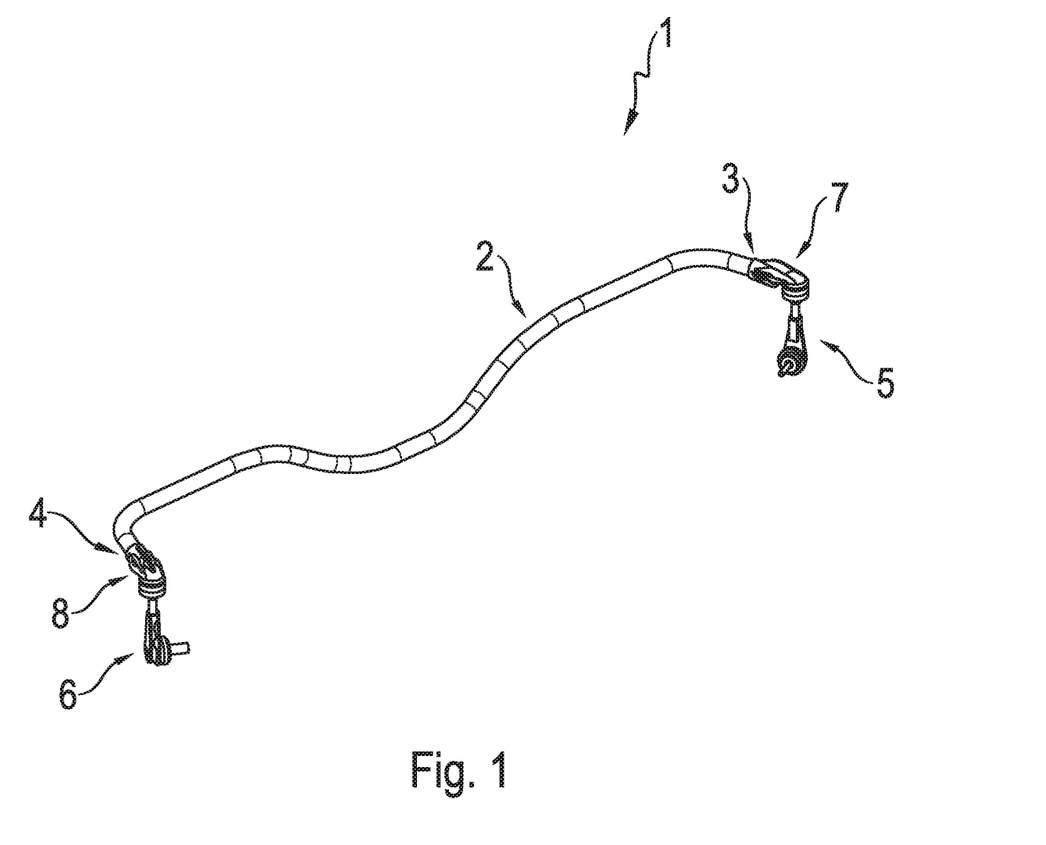
FIG. 1: A perspective front view of a stabilizer according to the invention.

FIG. 1 shows a perspective front view of a stabilizer 1 according to the invention. This is a torsion bar spring device that can be stressed by torsion, which can be used in the chassis of a vehicle to avoid rolling movements of the vehicle. The stabilizer 1 has a stabilizer body 2. The stabilizer body 2 is of bar- or rod-like design. Furthermore, the stabilizer body 2 is of curved shape. In this case, two stabilizer body ends 3, 4 remote from one another are arranged in such manner that the stabilizer body 2 is essentially U-shaped. Thus, the two stabilizer body ends 3, 4 constitute the arms of the essentially U-shaped stabilizer body 2. The stabilizer body 2 is made from a fiber-reinforced plastic or a fiber-plastic composite. As fibers, for example, endless glass or carbon fibers can be used, which are embedded in a duroplastic or thermoplastic matrix. The stabilizer body 2 can be hollow or tubular, or it can be made from a solid material.

In addition the stabilizer 1 has two pendulum supports 5, 6. In this case the pendulum support 5 is associated with the stabilizer body end 3 and the pendulum support 6 with the stabilizer body end 4.

Furthermore the stabilizer 1 has two connecting elements 7, 8. In this case the connecting element 7 is associated with the stabilizer body end 3 and the connecting element 8 with the stabilizer body end 4. In detail, the connecting elements 7, 8 are in each case arranged between the stabilizer body end 3 or 4 and the associated pendulum support 5 or 6, respectively. Thus, the connecting elements 7, 8 serve as a type of interface for force transfer between the stabilizer body 2 and the pendulum support 5, 6.

Figure 2:
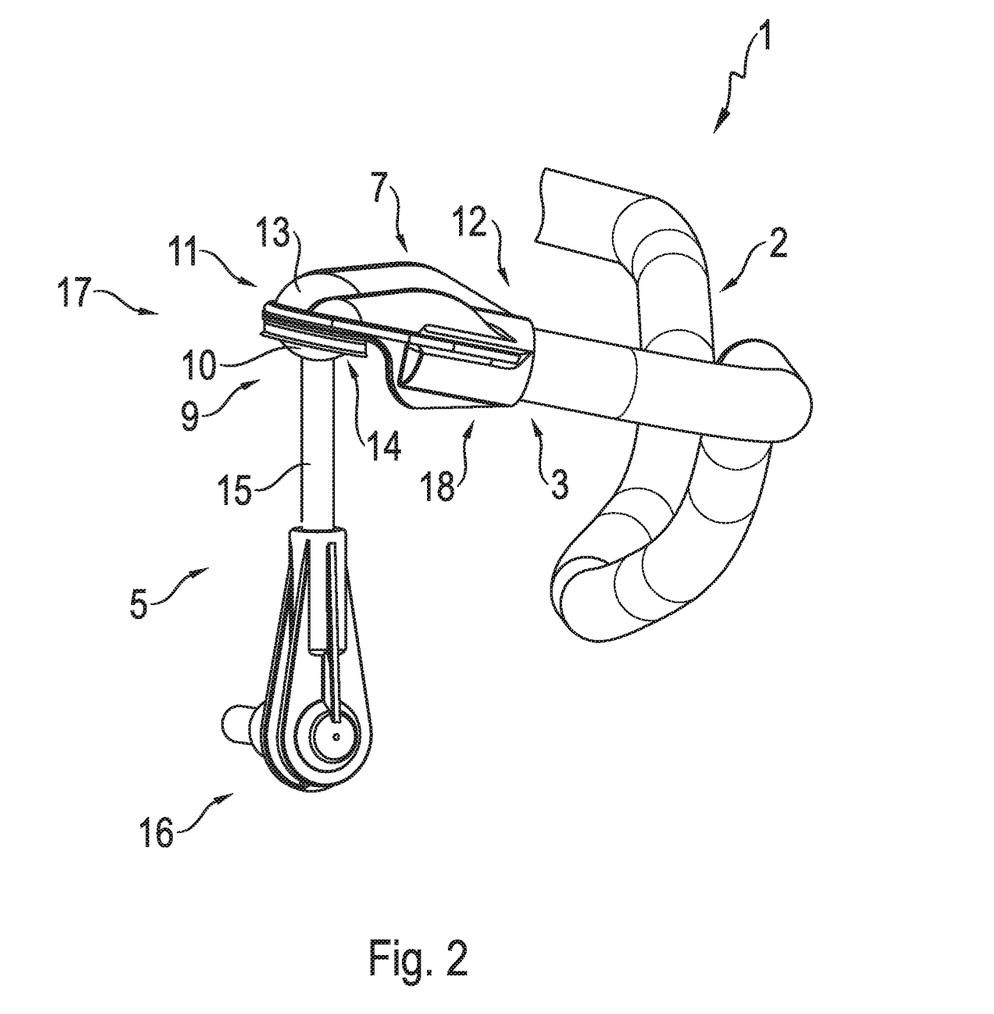
FIG. 2: A perspective side view of a section of the stabilizer according to the invention shown in FIG. 1, FIG. 3: A perspective view of a pendulum support for the stabilizer according to the invention shown in FIG. 1 or 2, FIG. 4: A perspective side view of a section of a stabilizer body end and a pendulum support without a connecting element.

FIG. 2 shows a perspective side view of a section of the stabilizer 1 according to the invention, as shown in FIG. 1. In detail, here the stabilizer body end 3 with the pendulum support 5 and the connecting element 7 are shown. The description below applies just as well to the stabilizer body end 4, the pendulum support 6 and the connecting element 8.

The connecting element 7 is made as an injection-molded component, which is injection-molded onto a first pendulum support end 9. The first pendulum support end 9 has a joint ball 10. The first pendulum support end 9 or the joint ball 10 is connected to a first end 11 of the connecting element 7.

Remote from the first end 11 of the connecting element 7 the latter has a second end 12. The second end 12 of the connecting element 7 is connected to the end 3 of the stabilizer body. In this example embodiment the second end 12 of the connecting element 7 is injection-molded onto the stabilizer body end 3. Alternatively, the second end 12 can be connected to the stabilizer body end 3 in a form-enclosing manner, particularly by a snap-on connection.

The first end 11 of the connecting element 7 has a joint housing section 13. The joint housing section 13 has a housing aperture 14 in which the joint ball 10 is fitted and able to move. Starting from the joint ball 10 a stud section 15 of the pendulum support 5 extends out of the joint housing section 13 or joint housing aperture 14 in the direction of a second pendulum support end 16 remote from the first pendulum support end 9. Thus, the connection of the first pendulum support end 9 to the connecting element 7 is made in the form of an articulated joint 17. In this example embodiment the articulated joint 17 is in the form of a ball joint connection.

The second end 12 of the connecting element 7 has a holding section 18. The holding section 18 surrounds the stabilizer body end 3, or the stabilizer body end 3 is at least partially accommodated in the holding section 18.

In this example embodiment the stabilizer 1 is formed as a composite component which consists of the stabilizer body 2, the pendulum supports 5, 6 and the connecting elements 7, 8. Since the connecting elements 7, 8 are injection-molded onto the stabilizer body ends 3, 4 with their first end 11 respectively on the first pendulum support end 9 and with the second end 12 respectively on the stabilizer body end 3 or 4, the composite component is a unit that cannot be taken apart non-destructively.

Figure 3:
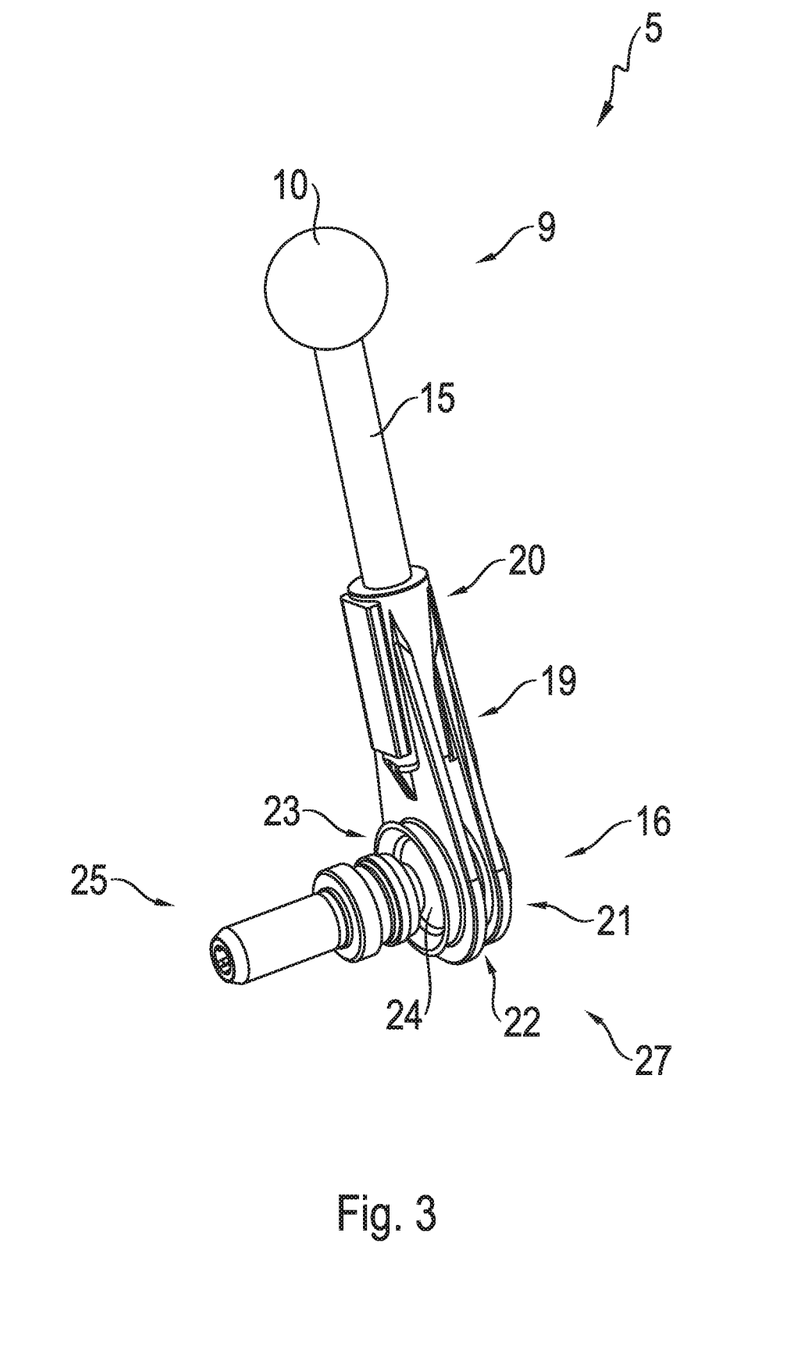

FIG. 3 shows a perspective view of the pendulum support 5 for the stabilizer 1 according to the invention, as shown in FIG. 1 or 2. The description below applies analogously, also to the pendulum support 6.

The pendulum support 5 has at its second pendulum support end 16 a connecting component 19. In this example embodiment, the connecting component 19 is injection-molded onto the second pendulum support end 16 as an injection-molded component. The connecting component is made from a plastic or fiber-plastic composite. The connecting component 19 has a first end 20 and, remote from it, a second end 21. The first end 20 of the connecting component 19 is connected solidly or in a rotationally fixed manner to an end of the stud section 15 remote from the joint ball 10.

The second end 21 of the connecting component 19 has a further joint housing section 22. The further joint housing section 22 has a further housing aperture 23. In the further housing aperture 23 is movably fitted a further joint ball 24 of a ball stud 25. Starting from the further joint ball 24 a further stud section 26 extends out of the further joint housing section 22 and the further housing aperture 23.

Thus, in the area of the second pendulum support end 16 there is a further articulated connection 27. In this example embodiment the further articulated connection 27 is in the form of a ball joint connection. The further stud section 26 can be connected to a chassis component such as a wheel carrier or a control arm.

Figure 4:
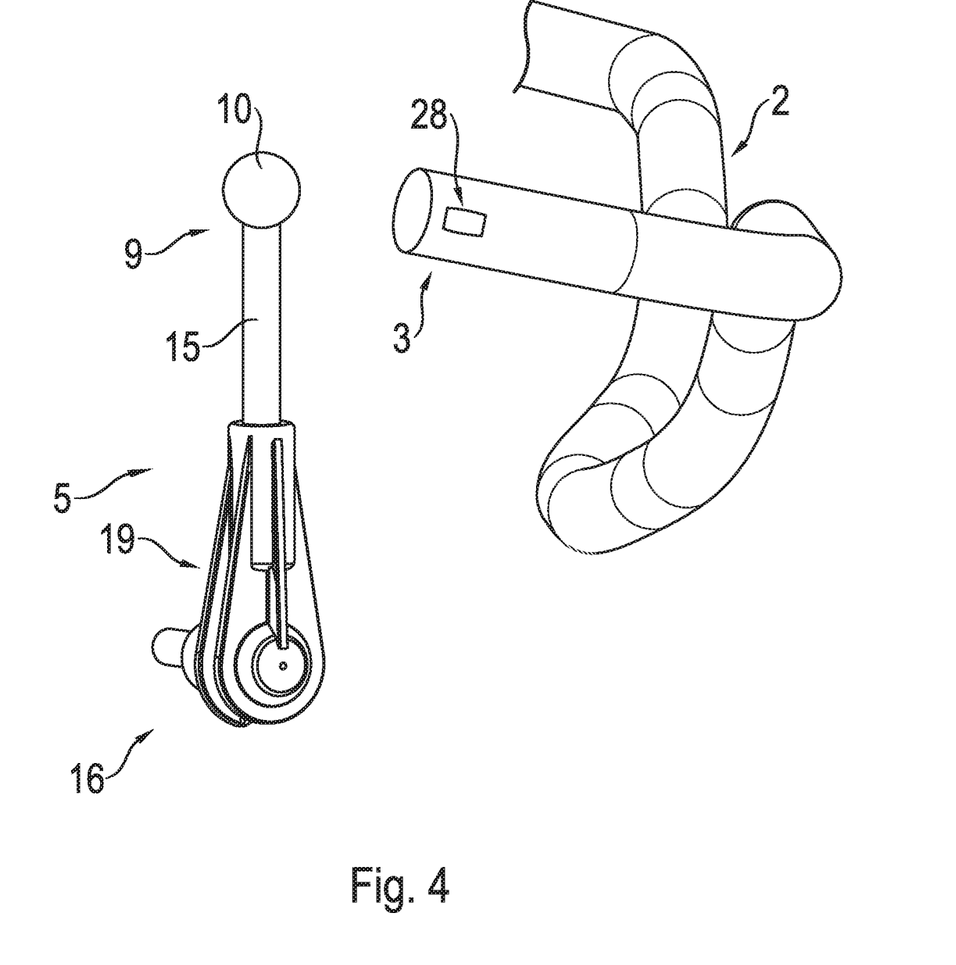

FIG. 4 shows a perspective side view of a section of the stabilizer body end 3 and the pendulum support 5 without the connecting element 7. The description below applies analogously to the stabilizer body end 4, the pendulum support 6 and the connecting element 8.

The stabilizer body end 3 has an anti-twist feature 28. The anti-twist feature 28 serves to ensure a non-rotating or rotationally fixed connection of the second end 12 of the connecting element 7 to the stabilizer body end 3, as in FIG. 2.

A corresponding anti-twist feature 28 can be in the form of an undercut and/or a flattened area in the outer or peripheral surface of the stabilizer body end 3.

In correspondence with the anti-twist feature 28 a further anti-twist feature (not shown in more detail) can be arranged in the area of the end 15 of the stud section of the pendulum support 9 directed away from the joint ball 10. In that case the further anti-twist feature serves to ensure a non-rotating and/or rotationally fixed connection of the connecting component 19 to the stud section 15.

To form a connection between the pendulum support 5 and the stabilizer body end 3, at least the first pendulum support end 9 is placed with the joint ball 10 and the stabilizer body end 3 in a suitable injection-molding die. Here, the first pendulum support end 9 is directed toward the stabilizer body end 3 and arranged with a specified distance between the first pendulum support end 9 and the stabilizer body end 3. Then, the connecting element 7 is made. According to this example embodiment, the connecting element 7 is injection-molded at the same time with its first end 11 onto the first pendulum support end 9 and with its second end 12 onto the stabilizer body end 3. Thus, a connection can be made between the pendulum support 5 and the stabilizer body 2 in a single work step. In this example embodiment the connecting element 7 is made of a plastic or a fiber-plastic composite.

Figure 5:
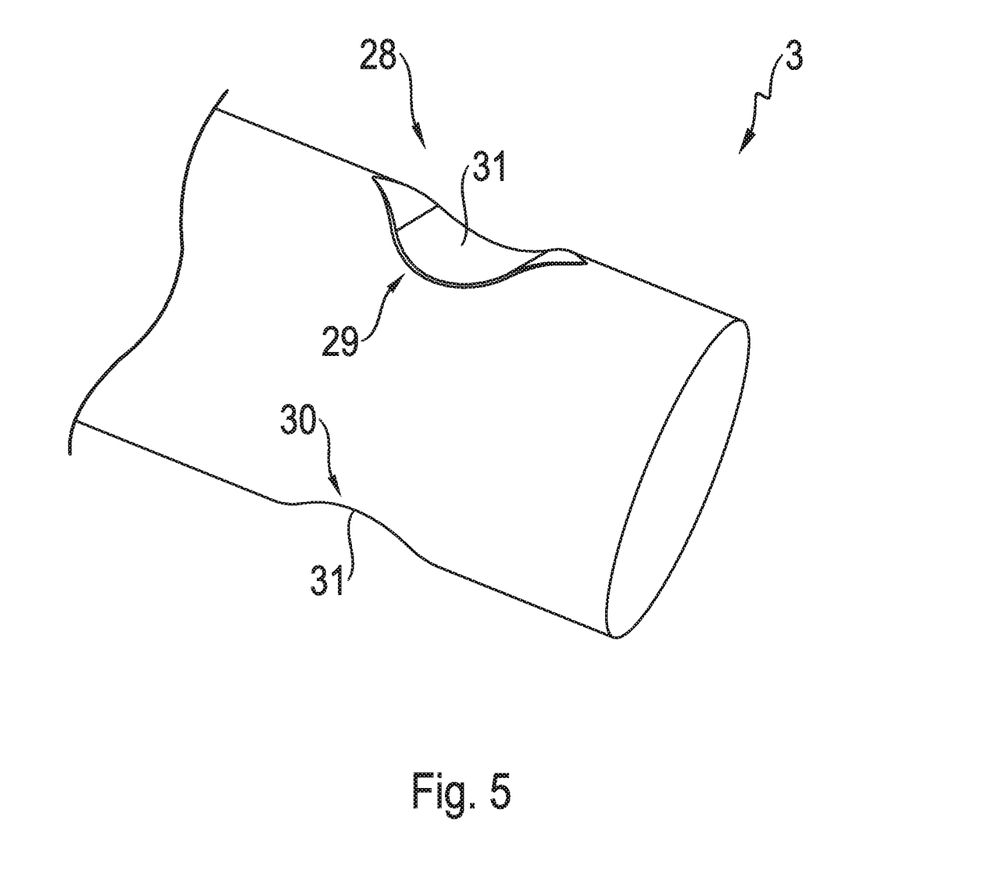
FIG. 5: A perspective view of a stabilizer body end without a connecting element.

FIG. 5 shows a perspective view of a stabilizer body end 3 without a connecting element 7. The description below applies to the stabilizer body end 4 as well.

The anti-twist feature 28 in this example embodiment is in the form of recesses 29 and 30 arranged on both sides of the stabilizer body end 3. The recesses 29, 30 are made in the outer peripheral surface of the stabilizer body end 3. The recesses 29, 30 are arranged on opposite sides of the stabilizer body end 3. Thus, the recesses 29, 30 face in opposite directions. Other than in their orientation, the recesses 29, 30 are of identical form.

The recesses 29 and 30 have a trough-like depression 31. When the stabilizer body end 3 is injection-molded to form the connecting element 7, at the same time the anti-twist feature 28 is injection-molded. During this the material for producing the connecting element 7 penetrates into the anti-twist feature, the recesses 29, 30 and the depression 31. Thus, once the material for producing the connecting element 7 has hardened, relative movement between the connecting element 7 and the end 3 of the stabilizer body is prevented.

INDEXES

1 Stabilizer
2 Stabilizer body

3 End of the stabilizer body
4 End of the stabilizer body
5 Pendulum support
6 Pendulum support
7 Connecting element
8 Connecting element
9 First pendulum support end
10 Joint ball
11 First end of the connecting element
12 Second end of the connecting element
13 Joint housing section
14 Housing aperture
15 Stud section
16 Second pendulum support end
17 Articulated joint
18 Holding section
19 Connecting component
20 First end of the connecting component
21 Second end of the connecting component
22 Further joint housing section
23 Further housing aperture
24 Further joint ball
25 Ball stud
26 Further stud section
27 Further articulated connection
28 Anti-twist feature
29 Recess
30 Recess
31 Depression

The invention claimed is:

1. A stabilizer for a chassis of a vehicle, the stabilizer comprising:
a curved stabilizer body that forms a torsion spring,
a pendulum support comprising a joint ball and a ball stud extending from the joint ball, the joint ball being a first end of the pendulum support and an end of the ball stud remote from the joint ball being a second end of the pendulum support,
a rigid connecting element having first and second ends, the connecting element connecting the stabilizer body and the pendulum support to one another, and
the first end of the connecting element is injection-molded onto the joint ball of the pendulum support, the second end of the connecting element is directly, rigidly fixed to a first end of the stabilizer body.

2. The stabilizer according to claim 1, wherein an articulated connection is formed, between the first end of the connecting element and the first end of the pendulum support, and the articulated connection is in a form of a ball joint connection.

3. The stabilizer according to claim 1, wherein the first end of the connecting element forms a housing in which the joint ball is mounted in an articulated manner, the second end of the connecting element is injection-molded onto to the first end of the stabilizer body.

4. The stabilizer according to claim 3, wherein one of a non-articulated joint and a solid joint is formed between the second end of the connecting element and the first end of the stabilizer body.

5. The stabilizer according to claim 1, wherein the second end of the connecting element is injection-molded onto the first end of the stabilizer body and the first end of the stabilizer body has recesses that receive anti-twist features of the second end of the connecting element such that movement between the connecting element and the first end of the stabilizer body is prevented.

6. The stabilizer according to claim 1, wherein the second end (12) of the connecting element (7, 8) is connected to the first end of the stabilizer body by at least one of a materially-merged connection and a form-enclosing connection.

7. The stabilizer according to claim 1, further comprising a structure in a form of a composite component, that cannot be taken apart non-destructively, such that the composite component consists of the connecting element, and at least one of the pendulum support and the stabilizer body.

8. The stabilizer according to claim 1, wherein the stabilizer body has the first end and a second end that are remote from one another, each of the first and the second ends of the stabilizer body are connected to a respective pendulum support by way of a respective connecting element.

9. The stabilizer according to claim 1, wherein the first end of the stabilizer body has an anti-twist feature that co-operates with the connecting element, and the anti-twist feature is in a form of at least one of an undercut, a flattened area and an oval contour.

10. The stabilizer according to claim 1, wherein at least one of the stabilizer body and the connecting element are made of either plastic or a fiber-plastic composite, and the pendulum support is made at least partially of either plastic or a fiber-plastic composite.

11. A stabilizer for a chassis of a vehicle, the stabilizer comprising:
a curved stabilizer body that forms a torsion spring,
first and second pendulum supports, each of the first and the second pendulum supports comprises a ball stud having one end fixed to a joint ball and an opposite end that is remote from the joint ball,
a connecting element and a connecting component,
the connecting element having first and second ends, the second end of the connecting element is injection molded onto an end of the stabilizer body such that the connecting element is rigidly connected directly to the stabilizer body, and the first end of the connecting element is injection-molded onto the joint ball of the first pendulum support such that the first pendulum support is pivotably connected to the connecting element and the stabilizer body, and
the connecting component having first and second ends, the first end of the connecting component is injection-molded onto the opposite end of the ball stud of the first pendulum support, and the second end of the connecting component is injection molded onto the joint ball of the second pendulum support such that the second pendulum support is pivotably connected to the connecting component and the first pendulum support.

12. The stabilizer according to claim 11, wherein the joint ball of the pendulum support is connected to the first end of the connecting element such that the pendulum support articulates with respect to the connecting element and the stabilizer, and the second end of the pendulum support is connected to the first end of the connecting component such that the pendulum support is fixed relative to the connecting component.

13. The stabilizer according to claim 12, wherein the second end of the connecting component has a joint housing which forms the articulated joint and receives another joint ball.

14. A method for producing a stabilizer having a curved stabilizer body that forms a torsion spring, a pendulum support and a connecting element, the connecting element connecting the stabilizer body and the pendulum support to one another, a first end of the connecting element is injection-molded onto a first end of the pendulum support, the method comprising:
- making the stabilizer body,
- making the pendulum support such that the first end of the pendulum support is a joint ball and a ball stud extends from the joint ball to a second end of the pendulum support,
- making the connecting element as an injection-molded component, and
- injection molding the second end of the pendulum support onto a first end of the stabilizer body at the same time as injection-molding the first end of the connecting element onto the joint ball of the pendulum support.

15. The method according to claim 14, further comprising, at the same time during the injection-molding of the connecting element, injection-molding the second end of the connecting element onto the first end of the stabilizer body in such a manner that relative movement of the connecting element to first end of the stabilizer body is prevented.

* * * * *